(12) United States Patent
Kang et al.

(10) Patent No.: US 7,230,957 B2
(45) Date of Patent: Jun. 12, 2007

(54) METHOD AND APPARATUS FOR MULTIPLEXING AND DEMULTIPLEXING VARIABLE-LENGTH PACKETS

(75) Inventors: Sung-soo Kang, Daejon (KR); Tae-kyu Kang, Jeonju (KR); Hae-Won Jung, Daejon (KR); Hyeong-ho Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1087 days.

(21) Appl. No.: 10/228,073

(22) Filed: Aug. 27, 2002

(65) Prior Publication Data

US 2003/0214979 A1 Nov. 20, 2003

(30) Foreign Application Priority Data

May 18, 2002 (KR) ................. 2002-27595

(51) Int. Cl.
*H04J 3/04* (2006.01)
*H04L 12/56* (2006.01)
(52) U.S. Cl. ........................ 370/535; 370/466
(58) Field of Classification Search ............. 370/476, 370/535, 536, 537, 412, 466, 468
See application file for complete search history.

(56) References Cited

U.S. PATENT DOCUMENTS

| | | | |
|---|---|---|---|
| 6,009,108 A | 12/1999 | Takehara et al. | |
| 6,081,523 A * | 6/2000 | Merchant et al. | 370/389 |
| 6,108,713 A * | 8/2000 | Sambamurthy et al. | 709/250 |
| 6,108,726 A * | 8/2000 | Runaldue et al. | 710/62 |
| 6,262,990 B1 | 7/2001 | Ejiri | |
| 6,269,107 B1 | 7/2001 | Jong et al. | |
| 6,282,211 B1 | 8/2001 | Ono et al. | |
| 6,618,395 B1 * | 9/2003 | Kimmitt | 370/473 |
| 6,690,682 B1 * | 2/2004 | Giaretta et al. | 370/535 |
| 6,718,139 B1 * | 4/2004 | Finan et al. | 398/59 |
| 6,781,986 B1 * | 8/2004 | Sabaa et al. | 370/389 |
| 6,873,630 B1 * | 3/2005 | Muller et al. | 370/356 |
| 6,920,135 B1 * | 7/2005 | Lea | 370/389 |
| 7,006,536 B1 * | 2/2006 | Somashekhar et al. | 370/538 |
| 7,149,226 B2 * | 12/2006 | Wolrich et al. | 370/412 |
| 2003/0161351 A1* | 8/2003 | Beverly et al. | 370/535 |
| 2003/0214974 A1* | 11/2003 | Beverly et al. | 370/476 |

\* cited by examiner

*Primary Examiner*—Chau Nguyen
*Assistant Examiner*—Marcus Smith
(74) *Attorney, Agent, or Firm*—Lowe Hauptman & Berner LLP

(57) ABSTRACT

Provided are a method and apparatus for multiplexing and demultiplexing variable-length high-speed packets. According to the method and apparatus, a plurality of one-gigabit Ethernet frames are multiplexed into a single 10-gigabit Ethernet frame and the single 10-gigabit Ethernet frame is demultiplexed into the plurality of one-gigabit Ethernet frames. In order to process variable-length high-speed packets, packet multiplexing instead of simple TDM is used and a larger input bandwidth than an output bandwidth is used, so that a statistical multiplex effect is accomplished. In addition, standard interface is used for input and output interface, so existing universal chips can be used.

29 Claims, 11 Drawing Sheets

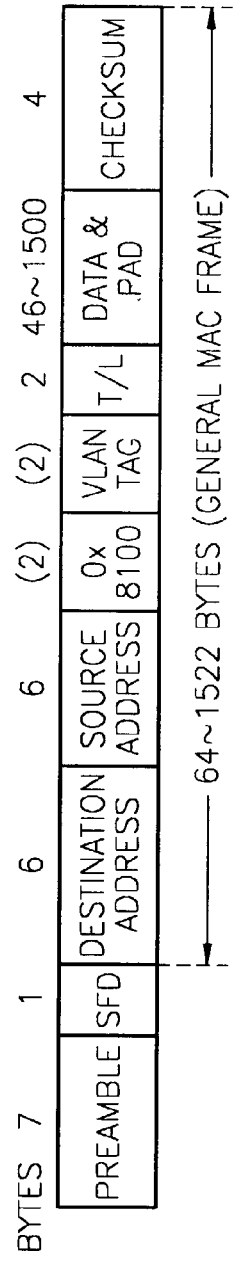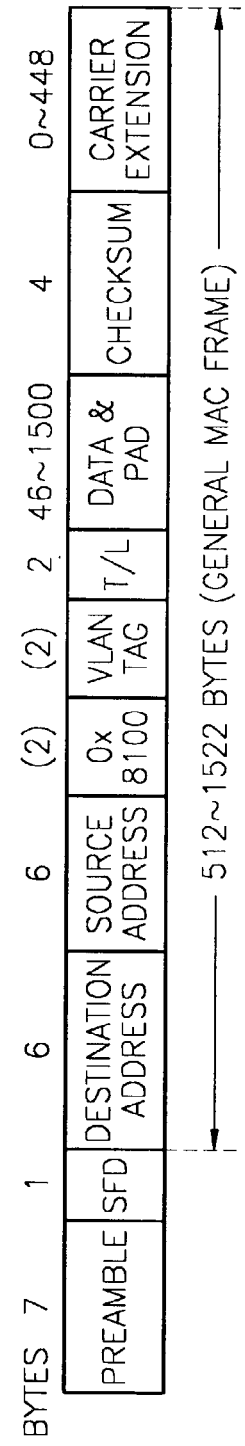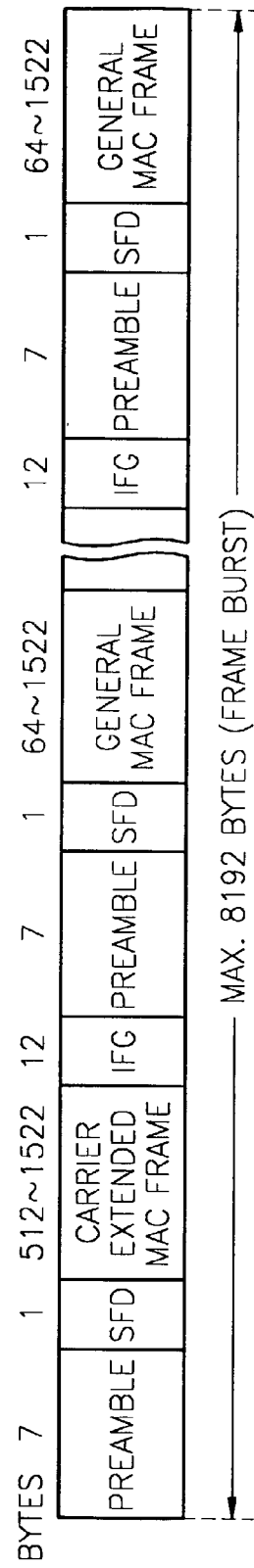

METHOD AND APPARATUS FOR MULTIPLEXING AND DEMULTIPLEXING VARIABLE-LENGTH PACKETS

BACKGROUND OF THE INVENTION

1. Field of the Invention

The present invention relates to a method and apparatus for multiplexing and demultiplexing variable-length high-speed packets, and more particularly, to a method and apparatus for multiplexing a plurality of one-gigabit Ethernet media access control (MAC) frames into a single 10-gigabit Ethernet frame and demultiplexing the single 10-gigabit Ethernet frame into the plurality of one-gigabit Ethernet MAC frames.

2. Description of the Related Art

Packet multiplexing is technology through which a transmitter converts a plurality of packets into a high-speed packet and transmits it to a receiver, and the receiver converts the received high-speed packet into the original plurality of low-speed packets and sent them to a destination.

In realizing such technology, it seems most practical to employ time division multiplexing (TDM) to multiplex low-speed input streams into a high-speed data stream. However, in the case of using TDM, it is necessary to configure a frame such that each input port can be recognized. Moreover, due to the characteristics of TDM, an exclusive channel must be used, which decreases bandwidth efficiency.

To overcome these drawbacks, various conventional methods and apparatuses have been proposed.

In order to multiplex and transmit burst data streams having different lengths, in U.S. Pat. No. 6,009,108 (December, 1999) is disclosed a multiplexing method for converting burst data streams, which have different lengths and are input from different data sources, into a fixed-length packet stream having a constant average transport rate.

In this method, when there is no data having at least the fixed length in a buffer, the data in the buffer is sent to a stuffing data generator to forward stuffing data. Through such operation, the average transport rate of fixed-length packets is maintained constant so that occurrence of buffer overflow and underflow with respect to bursts of data can be reduced in a receiver. However, since packets having a fixed length are generated, an extra conversion device is required for data having a variable length as in the Ethernet. Moreover, in this case, transport efficiency is decreased.

According to U.S. Pat. No. 6,282,211 B1 (August, 2001), transport efficiency is automatically optimized even if a user does not specially request. Here, a channel is dynamically allocated to an available time slot, and a cut-through function is performed within a multiplexer. Accordingly, cost incurred because a user plane is connected to the outside of a multiplexer output part, and a necessary signaling function is performed outside as well as inside, can be reduced.

However, the above-described methods employ conventional TDM channels to transport packets, so bandwidth efficiency is decreased, and the methods cannot be applied to the multiplexing of low-speed Ethernet packets into a high-speed Ethernet packet.

In U.S. Pat. No. 6,269,107 B1 (July, 2001) is disclosed a method of dividing a consecutive data stream into packetized elementary streams (PES) having a fixed length and subdividing a PES into transport streams.

In this method, in order to reduce overhead such as a high-speed circuit which is necessary to process individual packets in series, a plurality of input buffer are provided, and for many input streams having the same characteristic, the result of processing one of the input streams is applied to the other input streams so that a high-speed circuit is not required, and there is no need to separately process individual packets.

Such packet processing method is useful to a case in which a consecutive stream is long and the characteristics of individual packets are the same as in a video signal. However, it is difficult to apply this method to a case in which as in the Ethernet, packets have different lengths and different destinations. Moreover, it is nearly impossible to directly apply this method to a demultiplexer when packet length variation is very large as in the Ethernet.

U.S. Pat. No. 6,262,990 B1 (July, 2001) is provided for multiplexing data (video, audio, and low-speed data) having different speeds whose differences are large, and particularly, low-speed data having a burst characteristic into a fixed-length packet for transmission and for reducing a transmission delay.

In this method, variable-length data of low speed is converted into a fixed-length packet of high speed. However, it is difficult to apply this method to a case in which an output packet also has a variable length as in the Ethernet. Moreover, when a fixed-length packet is generated by stuffing, and a packet of high speed of, for example, 10 gigabits must be processed, a receiver needs to have a function of recognizing and removing the stuffing and reconfiguring the stuffing data into an Ethernet packet.

As described above, conventional TDM methods decrease bandwidth efficiency. Conventional methods of converting and multiplexing data into a fixed-length packet cannot immediately applied to high-speed packets having lengths ranging from 64 bytes to 1522 bytes, but a protocol converter for reconverting the converted high-speed packet into an original Ethernet packet is required together with an extra high-speed switch. In addition, an extra interface circuit for connection to an existing chip set is required.

SUMMARY OF THE INVENTION

To solve the above-described problems, it is an object of the present invention to provide an apparatus and method for multiplexing and demultiplexing packets, in which cost is reduced by using a universal chip, i.e., by using a standard interface, and the efficiency of a channel is maximized through packet multiplexing.

In view of the present invention, by using gigabit media independent interface (GMII) and 10-gigabit media independent interface (XGMII), which are IEEE 802.3 standard interface, between a gigabit Ethernet MAC block and a 10-gigabit Ethernet transceiver, a universal chip (for example, IBM NP4GS3, Broadcom BCM5633, Vitesse VSC7226, PMC-Sierra PMC8355, or MARVEL 88X2040) can be used, and variable-length Ethernet frames can be multiplexed and demultiplexed for transmission without changing a protocol.

In addition, without using an expensive complicated function block such as a co-processor for packet classification or traffic management, packets can be dynamically multiplexed to generate and transmit a 10-gigabit Ethernet frame. Moreover, when gigabit Ethernet frames are transmitted, 10 or more gigabit Ethernet ports can be multiplexed.

To achieve the above object of the present invention, there is provided an apparatus for multiplexing variable-length packets. The apparatus includes a plurality of input buffers for storing gigabit Ethernet media access control (MAC) data which is input according to GMII; a multiplexer monitor block for determining an operating mode of each input buffer based on management and status information of gigabit Ethernet MAC data; a selection controller for generating a control signal for selecting one of the plurality of input buffers; and a selection and conversion block for sequentially selecting the gigabit Ethernet MAC data in response to the control signal, converting the selected gigabit Ethernet MAC data into XGMII data, and outputting the XGMII data according to XGMII.

To achieve the above object of the present invention, there is also provided a method of multiplexing variable-length packets. The method includes a step in which a plurality of input buffers store gigabit Ethernet MAC data which is input according to GMII; a step in which a multiplexer monitor block determines an operating mode of each input buffer based on management and status information of gigabit Ethernet MAC data; a step in which a selection controller generates a control signal for selecting one of the plurality of input buffers; and a step in which a selection and conversion block sequentially selects the gigabit Ethernet MAC data in response to the control signal, converts the selected gigabit Ethernet MAC data into XGMII data, and outputs the XGMII data according to XGMII.

To achieve the above object of the present invention, there is also provided an apparatus for demultiplexing variable-length packets. The apparatus includes a buffer and converter block for storing XGMII data that is input according to XGMII and converting the XGMII data into MAC data; a port selection block for transmitting the gigabit Ethernet MAC data from the buffer and converter block to a particular gigabit Ethernet output port; a port analysis and control block for analyzing the destination and the receiving condition of the gigabit Ethernet MAC data and selecting a gigabit Ethernet output port to which the gigabit Ethernet MAC data is to be transmitted; a demultiplexer monitor block for determining whether each of gigabit Ethernet output ports operates in a full duplex mode or a half duplex mode and informing the port analysis and control block of the result of determination; and a plurality of output buffers for storing the gigabit Ethernet data received via the port selection block and outputting it.

To achieve the above object of the present invention, there is also provided a method of demultiplexing variable-length packets. The method includes a step in which a buffer and converter block stores XGMII data that is input according to XGMII and converts the XGMII data into a gigabit Ethernet MAC data; a step in which a port analysis and control block analyzes the destination and the receiving condition of the gigabit Ethernet MAC data and selects a gigabit Ethernet output port to which the gigabit Ethernet MAC data is to be transmitted; a step in which a demultiplexer monitor block determines whether each of gigabit Ethernet output ports operates in a full duplex mode or a half duplex mode and informs the port analysis and control block of the result of determination; a step in which a port selection block transmits the gigabit Ethernet MAC data from the buffer and converter block to a particular gigabit Ethernet output port; and a step in which a plurality-of output buffers for storing the gigabit Ethernet data received via the port selection block and outputting it.

To achieve the above object of the present invention, there is also provided an apparatus for transmitting variable-length packets. The apparatus includes a variable-length packet multiplexer for converting a plurality of Ethernet MAC frames, which are received according to GMII, into 10-gigabit Ethernet media independent interface data and outputting the converted data according to XGMII; and a variable-length packet demultiplexer for converting 10-gigabit Ethernet media independent interface data, which is received according to XGMII, into a plurality of Ethernet MAC frames and outputting the Ethernet MAC frames.

BRIEF DESCRIPTION OF THE DRAWINGS

The above object and advantages of the present invention will become more apparent by describing in detail preferred embodiments thereof with reference to the attached drawings in which:

FIGS. 1A through 1C are diagrams of the structures of Ethernet frames;

DETAILED DESCRIPTION OF THE INVENTION

Figure 2:
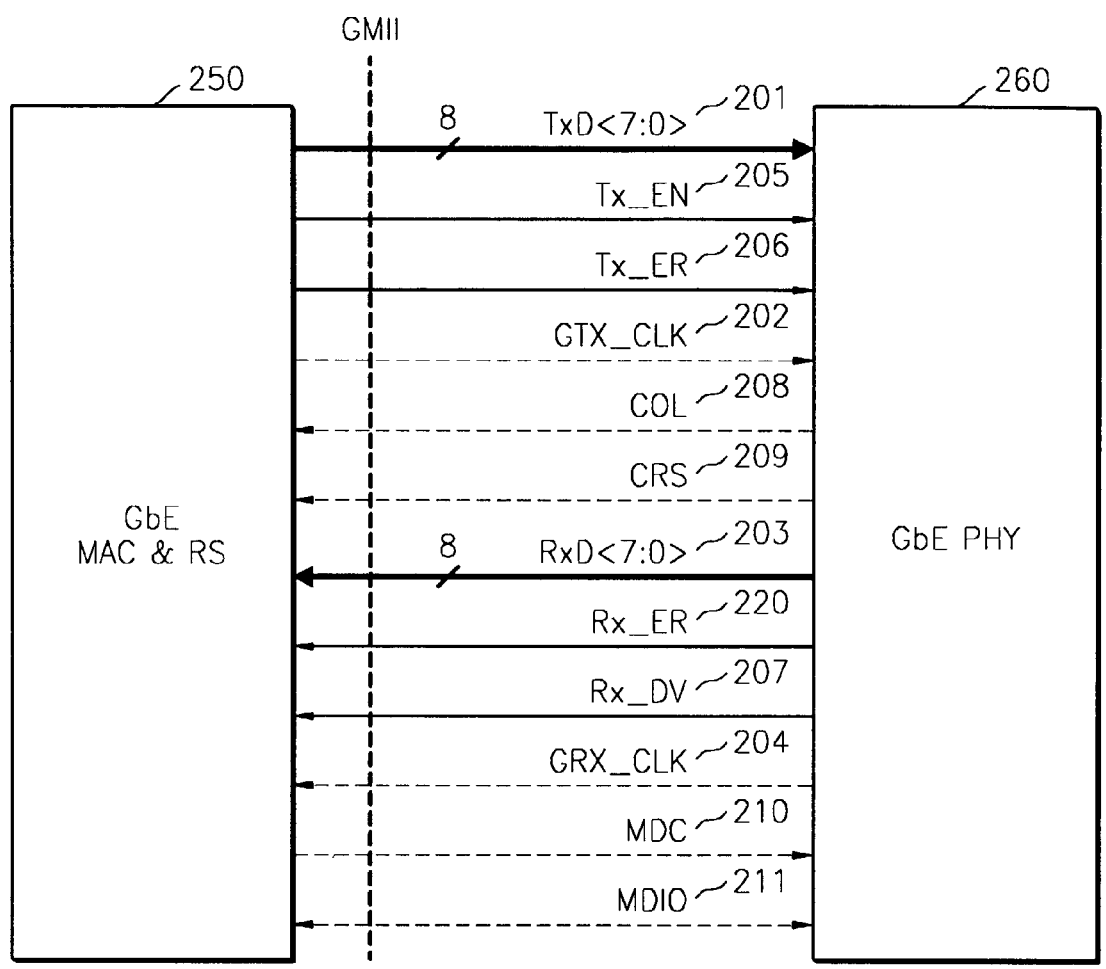
FIG. 2 is a diagram of gigabit media independent interface (GMII), i.e., standard gigabit Ethernet interface.

Hereinafter, preferred embodiments of the present invention will be described in detail with reference to the attached drawings.

The structures and operations of Ethernet frames will be described in terms of standards defined by IEEE 802.3 with reference to FIGS. 1A through 1C.

FIG. 1A shows the structure of a general Ethernet media access control (MAC) frame. If a preamble of 7 bytes, in which 1 and 0 are sequentially and alternately repeated like 10101010, is followed by 10101011, i.e., a Start of Frame Delimiter (SFD), the SFD is recognized, and an MAC frame starts. The SFD is followed sequentially by a 6-byte destination address (DA) and a 6-byte source address (SA). In case of a virtual local area network (VLAN), the source address is followed sequentially by a 2-byte 0×8100 value indicating a VLAN tag and a 2-byte VLAN tag.

In the next two bytes is recorded type/length information. Thereafter, a variable-length data and pad field of 46–1500 bytes is continued, and 4-byte checksum information is finally added. Since the Ethernet defines 64 bytes as the minimum length, when the length of data is shorter than the minimum length, a pad is added to make the length 64 bytes. Such frame structure can be used in both full duplex (FDX) transmission and half duplex (HDX) transmission.

FIG. 1B shows the structure of a carrier extended MAC frame, and FIG. 1C shows the structure of a frame burst.

This frame structure is compatible with existing 10- or 100-megabit Ethernet and increases transmission efficiency when a gigabit Ethernet is used in an HDX method.

As shown in FIG. 1B, the minimum carrier slot time of carrier sense multiple access/collision detection (CSMA/CD) is extended from existing 64 byte time to 512 byte time. The minimum length of an Ethernet frame to be actually transmitted, i.e., 64 bytes, is maintained, and a kind of padding referred to as a carrier extension is added at the end of the frame. The padding indicates a length adjustment byte which is added to make a frame have at least 512 bytes, so 0 through 448 bytes are added as a padding.

When a frame of less than 512 bytes is transmitted through carrier extension, a pad is added, which greatly decreases transmission efficiency. To compensate for a decrease in transmission efficiency, frame bursts are used. In other words, after a single transmitting terminal completes initial frame transmission without collision, the next frame is continuously transmitted without releasing a carrier.

In this case, collision does not occur since other terminals are maintained in a carrier release standby state. In such burst transmission, transmission can be continued from initial frame transmission to a burst limit at which the duration of a transmission timer expires.

In other words, in case of continuous data transmission, when the length of a frame to be initially transmitted is less than 512 bytes, as described above, carrier extension is needed since the length of the frame must be adjusted to 512 bytes before transmission. When the length of the initial frame is at least 512 bytes, carrier extension is not needed. After initial frame transmission is successfully performed, carrier slot time is secured, so that data including a preamble and an inter frame gap (IFG) of a maximum of 8192 bytes can be transmitted. Accordingly, the following frames to be continuously transmitted do not need carrier extension.

The configuration and operations of gigabit media independent interface (GMII), i.e., standard interface through which gigabit Ethernet MAC is connected to a physical layer via a reconciliation sublayer (RS), will be described in view of specifications defined in IEEE 802.3.

In FIG. 2 showing GMII, TxD<7:0> 201 denotes transmission data which is transmitted from a 1000Base-X/T MAC & RS (GbE MAC & RS) 250 to a 1000Base-X/T physical layer (GbE PHY) 260 in an 8-bit parallel format. GTX_CLK 202 denotes a 125 MHz clock signal which is sent from the GbE MAC & RS 250 to the GbE PHY 260 for transmission of the TxD<7:0> 201.

RxD<7:0> 203 denotes receiving data through which data received by the GbE PHY 260 is transmitted to the GbE MAC & RS 250. The RxD<7:0> 203 is transmitted in an 8-bit parallel format. GRX_CLK 204 denotes a 125 MHz clock signal which is sent from the GbE PHY 260 to the GbE MAC & RS 250 for transmission of the RxD<7:0> 203.

Tx_EN 205 denotes a signal informing that the GbE MAC & RS 250 transmits data to the GbE PHY 260 during data transmission. In other words, the signal Tx_EN 205 becomes a logical one (high) while the GbE MAC & RS 250 transmits data to the GbE PHY 260 and becomes a logical zero (low) while the GbE MAC & RS 250 does not transmit data to the GbE PHY 260. A signal Tx_ER 206 becomes high either when an error occurs during actual data transmission or when a carrier extension error occurs during carrier extension. Otherwise, the signal Tx_ER 206 becomes low.

Rx_DV 207 denotes a signal informing that the GbE PHY 260 transmits data to the GbE MAC & RS 250 during data transmission. In other words, the signal Rx_DV 207 becomes high while the GbE PHY 260 transmits data to the GbE MAC & RS 250 and becomes low while the GbE PHY 260 does not transmit data to the GbE MAC & RS 250.

A signal Rx_ER 220 becomes high either when an error occurs during actual data transmission the GbE PHY 260 to the GbE MAC & RS 250 or when a carrier extension error occurs during carrier extension.

COL 208 denotes a signal for the GbE PHY 260 to inform the GbE MAC & RS 250 of occurrence of collision. In case where the GbE PHY 260 is an HDX mode, a signal CRS 209 is high when a transmit & receive medium is used and is low when the transmit & receive medium is in an idle state. In case where the GbE PHY 260 is used as a repeater, the signal CRS 209 is high only when the GbE PHY 260 is in use. Otherwise, the signal CRS 209 is low.

Accordingly, the signals CRS 209 and COL 208 are used when the gigabit Ethernet operates in an HDX mode. When the GbE PHY 260 operates in an FDX mode, the GbE MAC & RS 250 ignores the signals CRS 209 and COL 208 generated by the GbE PHY 260.

Signals MDC 210 and MDIO 211 between the GbE MAC & RS 250 and a station management entity (STA) are used when the GbE MAC & RS 250 brings operating control (FDX or HDX) and status information of the GbE PHY 260.

Figure 3:
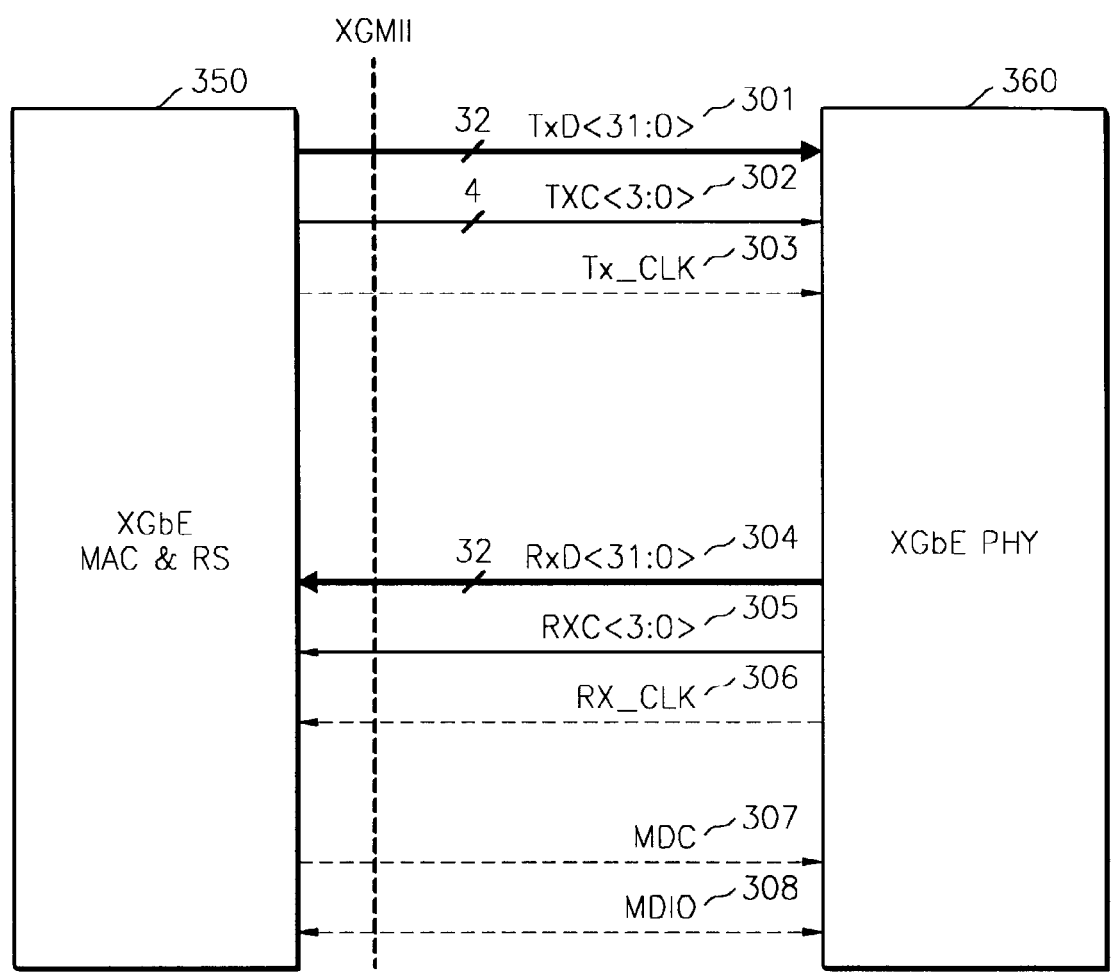
FIG. 3 is a diagram of 10-gigabit media independent interface (XGMII), i.e., standard 10-gigabit Ethernet interface.

FIG. 3 is a diagram of 10-gigabit media independent interface (XGMII), i.e., standard 10-gigabit Ethernet interface. XGMII is a standard interface specification defined in IEEE 802.3 based on which MAC is connected to a physical layer via an RS.

In FIG. 3, TxD<31:0> 301 denotes transmission data which a GBase-X MAC & RS (XGbE MAC & RS) 350 transmits to a 10 GBase-X/T PHY (XGbE PHY) 360 in a 32-bit parallel format in which four 8-bit groups like TxD<7:0>, TxD<15:8>, TxD<23:16>, and TxD<31:24> are transmitted via four lanes.

TXC<3:0> 302 denotes a 4-bit parallel signal transmitted from the XGbE MAC & RS 350 to the XGbE PHY 360 and indicates whether the TxD<31:0> 301 is a data signal or a control signal. In other words, according to the high or low state of each signal bit of TXC<3:0>, the individual bits TXC<0>, TXC<1>, TXC<2>, and TXC<3>, respectively, indicate whether each of the respective values of TxD<7:0>, TxD<15:8>, TxD<23:16>, and TxD<31:24> is actual MAC frame data or a preamble, SFD, or end-of-frame for the transmission of a MAC frame, or an error signal.

TX_CLK 303 denotes a 156.25 MHz clock signal which is sent from the XGbE MAC & RS 350 to the XGbE PHY 360 for transmission of the data TxD<31:0> 301. TxD<31:0> 301 and TXC<3:0> 302 are transmitted at a double data rate (DDR) in synchronization with the clock signal TX_CLK 303.

RxD<31:0> 304 denotes data through which the XGbE PHY 360 transmits received data to the XGbE MAC & RS 350 in a 32-bit parallel format in which four 8-bit groups like RxD<7:0>, RxD<15:8>, RxD<23:16>, and RxD<31:24> are transmitted via four lanes.

RXC<3:0> 305 denotes a 4-bit parallel signal transmitted from the XGbE PHY 360 to the XGbE MAC & RS 350 and indicates whether the RxD<31:0> 305 is a data signal or a control signal. In other words, according to the high or low state of each signal bit of RXC<3:0>, the individual bits RXC<0>, RXC<1>, RXC<2>, and RXC<3>, respectively, indicate whether each of the respective values of RxD<7:0>, RxD<15:8>, RxD<23:16>, and RxD<31:24> is actual MAC frame data or a preamble, SFD, or end-of-frame for the transmission of a MAC frame, or an error signal.

RX_CLK 306 denotes a 156.25 MHz clock signal which is sent from the XGbE PHY 360 to the XGbE MAC & RS 350 for transmission of the data RxD<31:0> 304. RxD<31:0> 304 and RXC<3:0> 305 are transmitted at a DDR in synchronization with the clock signal RX_CLK 306. Signals MDC 307 and MDIO 308 between the XGbE MAC & RS 350 and an STA are used when the XGbE MAC & RS 350 brings operating control (such as speed selection) and status information of the XGbE PHY 360.

Figure 4:
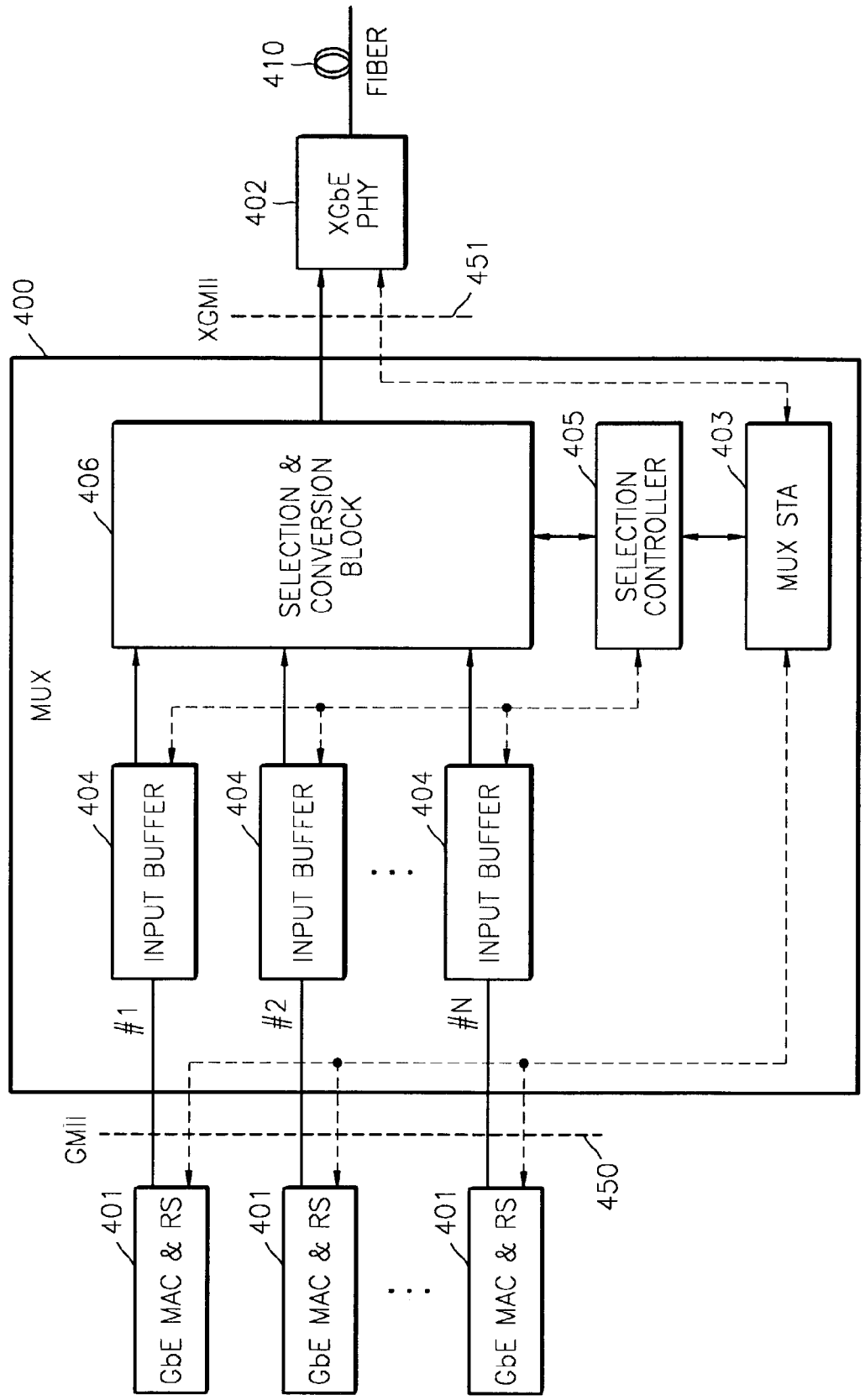
FIG. 4 is a schematic block diagram of a multiplexer according to an embodiment of the present invention.

FIG. 4 is a schematic block diagram of a multiplexer according to an embodiment of the present invention. A GbE MAC & RS 401 shown in FIG. 4 falls within a transmitting part of the GbE MAC & RS 250 shown in FIG. 2. GMII 450 is composed of signals TxD<7:0>, Tx_EN, Tx_ER, GTX_CLK, CRS, and COL, which are necessary for the GbE MAC & RS 250 to transmit data to the GbE PHY 260, and signals MDC and MDIO, which are necessary for management, among the elements of the GMII shown in FIG. 2.

An XGbE PHY 402 falls within a transmitting part of the XGbE PHY 360 shown in FIG. 3. XGMII 451 is composed of signals TxD<31:0>, TXC<3:0>, and TX_CLK, which are necessary for the XGbE MAC & RS 350 to transmit data to the XGbE PHY 360, and signals MDC and MDIO, which are necessary for management, among the elements of the XGMII shown in FIG. 3.

A multiplexer monitor block (MUX STA) 403 apprehends the operating mode (i.e., FDX or HDX) of each port which is connected to the GMII 450 by monitoring management information and status information that are generated by the GbE MAC & RS 401.

A multiplexer (MUX) 400 stores gigabit Ethernet signals, which are described in FIG. 1 and received via the GMII 450, in a plurality of input buffers 404, converts the signals into 10-gigabit Ethernet signals through the operations of a selection controller 405 and a selection & conversion block 406, and outputs the converted signals via the XGMII 451. Since the output 10-gigabit Ethernet signals are transmitted only in an FDX mode, the structure of each frame is the same as that shown in FIG. 1A, and an IFG of a 10-gigabit Ethernet specification is inserted between consecutive individual frames. A fiber 410 is a transport medium that transmits 10-gigabit Ethernet signals.

Figure 5:
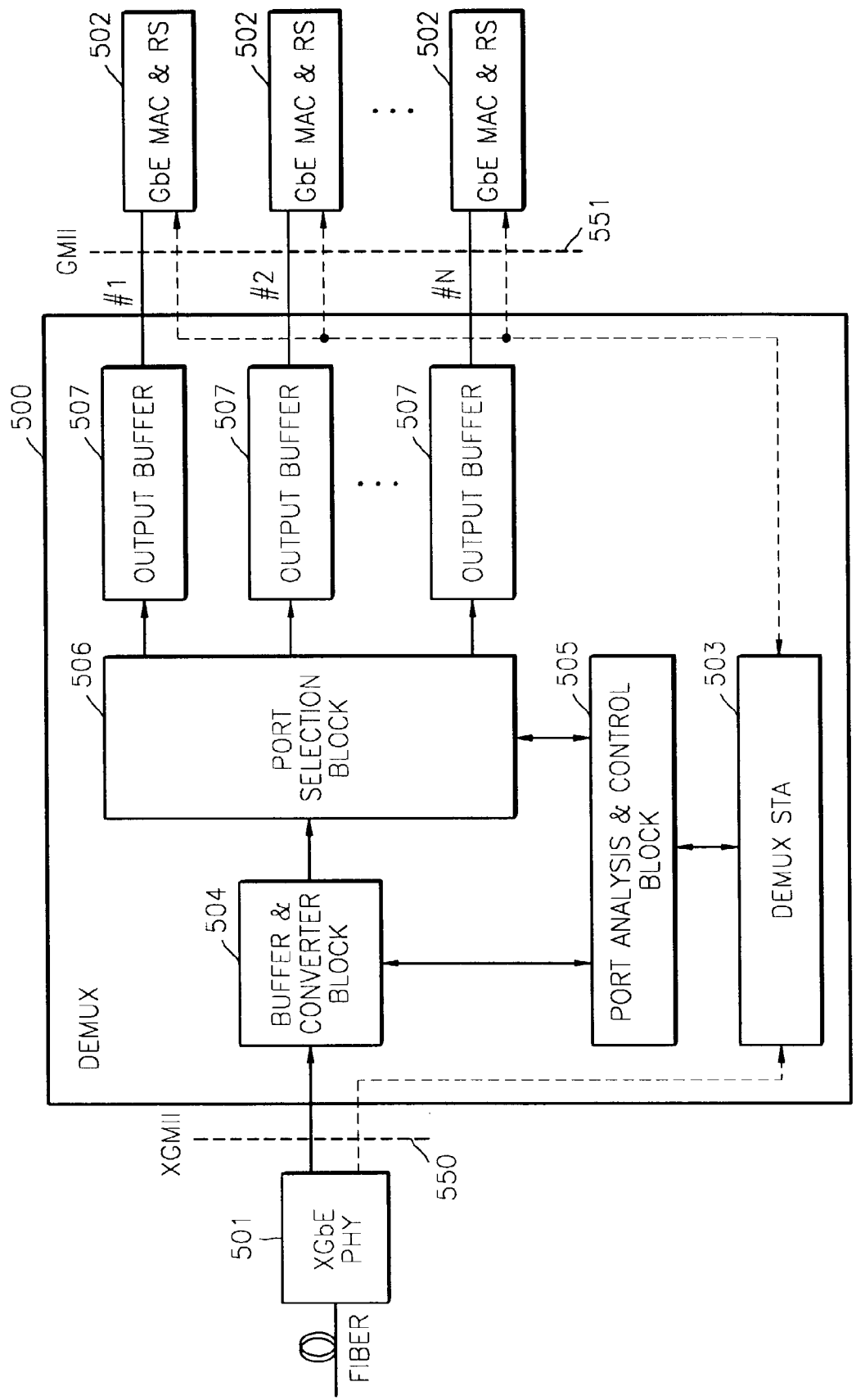
FIG. 5 is a schematic block diagram of a demultiplexer according to an embodiment of the present invention.

FIG. 5 is a schematic block diagram of a demultiplexer according to an embodiment of the present invention. An XGbE PHY 501 falls within a receiving part of the XGbE PHY 360 of FIG. 3. XGMII 550 is composed of signals RxD<31:0>, RXC<3:0>, and RX_CLK, which are necessary for the GbE MAC & RS 350 to receive data from the GbE PHY 360, and signals MDC and MDIO, which are necessary form management, among the elements of the XGMII shown in FIG. 3. A GbE MAC & RS 502 falls within a receiving part of the GbE MAC & RS 250 of FIG. 2.

GMII 551 is composed of signals RxD<7:0>, Rx_DV, Rx_ER, GRX_CLK, CRS, and COL, which are necessary for the GbE MAC & RS 250 to receive data from the GbE PHY 260, and signals MDC and MDIO, which are necessary for management, among the elements of the GMII shown in FIG. 2. A demultiplexer monitor block (DEMUX STA) 503 apprehends the operating mode (i.e., FDX or HDX) of each port which is connected to the GMII 551 by monitoring management information and status information that are generated by the GbE MAC & RS 502.

In FIG. 5, a demultiplexer (DEMUX) 500 stores a 10-gigabit Ethernet signal, which is received via the XGMII 550, in a buffer & converter block 504, converts it into gigabit Ethernet signals described in FIG. 1 through the operations of a port analysis & control block 505 and a port selection block 506, and outputs the converted signals via the GMII 551. An output buffer 507 falls within a receiving part of the GbE MAC & RS 250 of FIG. 2.

Figure 6:
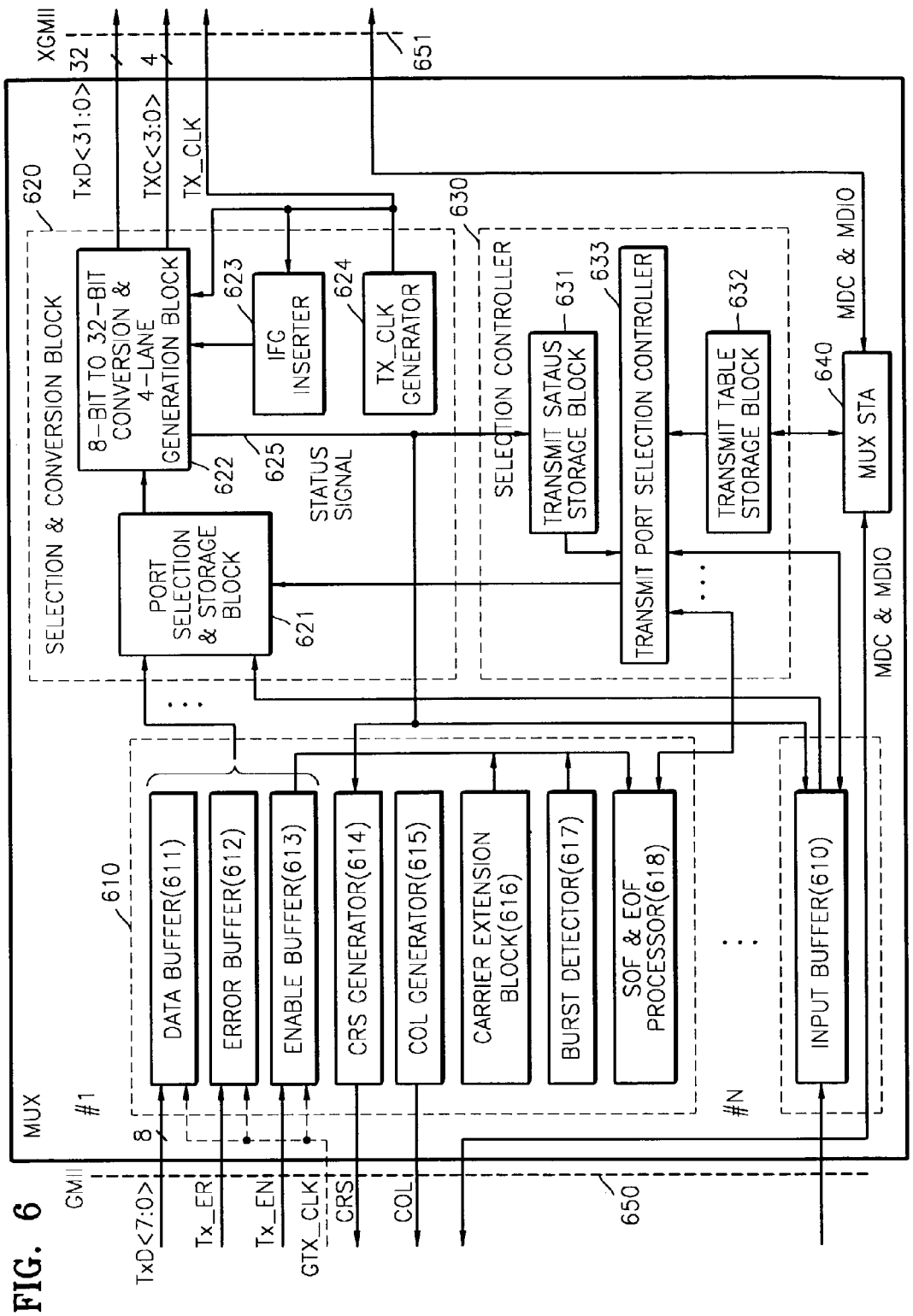
FIG. 6 is a detailed block diagram of a multiplexer according to the present invention.

FIG. 6 is a detailed block diagram of a multiplexer according to the present invention. An input buffer 610, a selection & conversion block 620, a selection controller 630, and a MUX STA 640 shown in FIG. 6 are the same functional blocks as the input buffer 404, the selection & conversion block 406, the selection controller 405, and the MUX STA 403 included in the MUX 406 shown in FIG. 4.

GMII 650 and XGMII 651 are the same as the GMII 450 and the XGMII 451 shown in FIG. 4. During MUX operating control, each of the ports #1 through #N is set to FDX or HDX according to the status information of the MUX STA 640. When auto-negotiation is required during this setting process, the MUX STA 640 may operate in association with a DEMUX STA within a demultiplexer. However, such detailed operation may be different depending on an actual chip and is not included in the scope of the present invention.

A burst detector 617 detects a case where a plurality of Ethernet frames are continuously transmitted in a lump. The burst detector 617 operates such that it outputs a signal having a low state in an idle state, outputs a signal having a high state the moment the signal Tx_EN becomes high, and outputs a signal having a low state only when both signals Tx_EN and Tx_ER are low.

A carrier extension block 616 detects carrier extension, and its output is maintained in a high state only while the signal Tx_ER is high and the signal Tx_EN is low.

A start-of-frame & end-of-frame (SOF & EOF) processor 618 stores register triples each of which is composed of a timer value, an SOF address, and an EOF address; a value indicating the number of register triples standing by ready to be processed at present; and a pointer designating a register triple that stands by for a longest time among the standby register triples.

Such register triples are stored in a round robin buffer. Accordingly, in case where there are a plurality of register triples, when the value of the pointer designating the oldest register triple among the standby register triples at present is increased, the pointer automatically designates the next register triple.

The SOF address of a data buffer 611 is stored when the output of an enable buffer 613 initially becomes high after the outputs of the enable buffer 613, the carrier extension block 616, and the burst detector 617 are low. The value indicating the number of standby register triples at present is increased by one. Thereafter, the EOF address of the data buffer 611 is stored when the enable buffer 613, the carrier extension block 616, and the burst detector 617 simultaneously become low, and at this moment the timer starts and thereafter all timer values within the SOF & EOF processor 618 are increased by one at predetermined time intervals.

In such a structure, even when because frames are not processed, there are a lot of standby register triples, and many SOFs and EOFs are stored, if the data buffer 611 does not overflow, a plurality of separate frames can be all processed. Accordingly, when the value of the register indicating the number of standby register triples at present is zero, it is not necessary to process a relevant port (for example, the port #1) because there an Ethernet frame to be processed does not exist or is being received.

Figure 7:
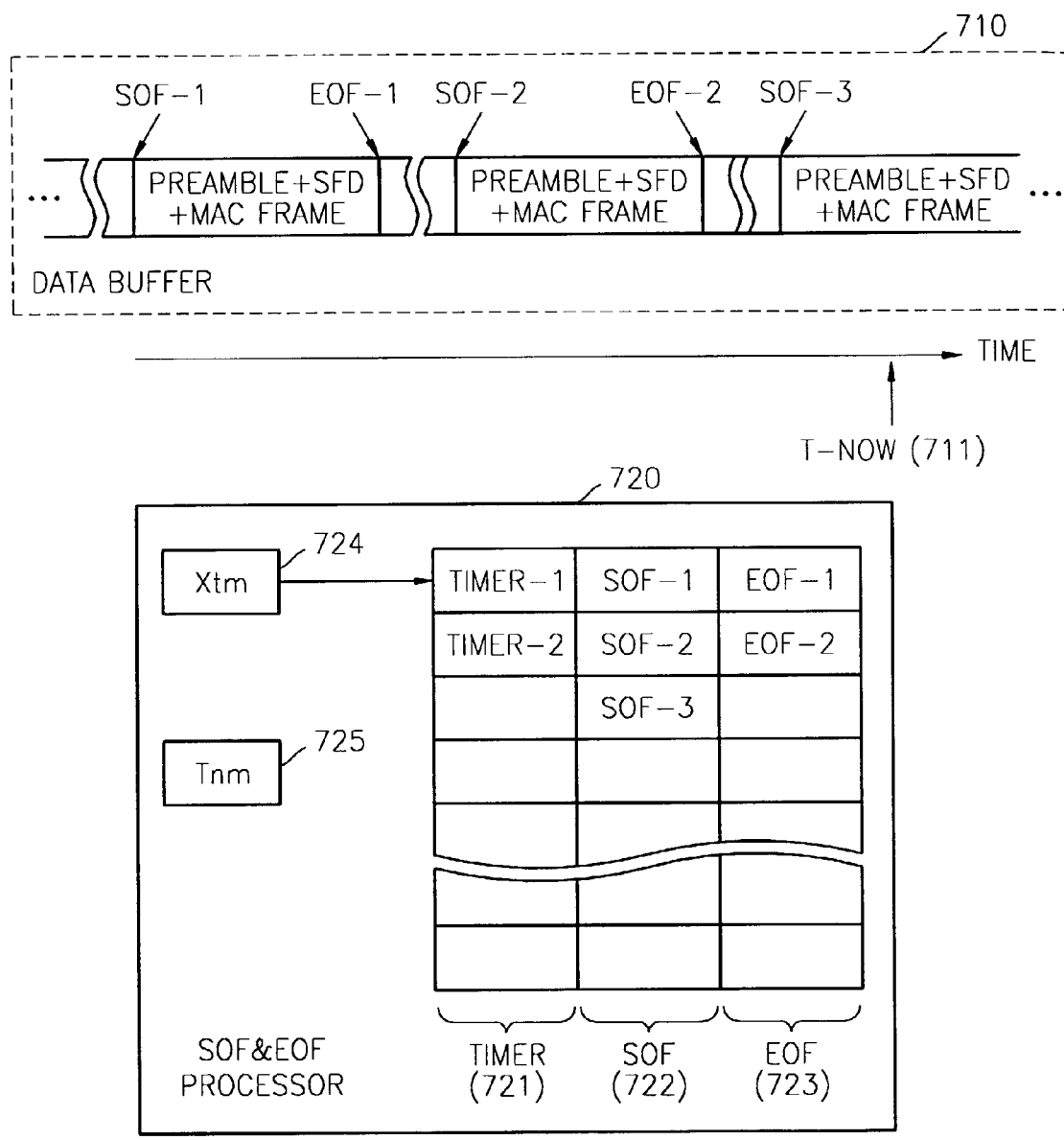
FIG. 7 is a diagram of the structure of an internal table which is used during data and frame start and end processes.

FIG. 7 is a diagram of the structure of an internal table which is used during data and frame start and end processes. A data buffer 710 and a SOF & EOF processor 720 shown in FIG. 7 are the same as the data buffer 611 and the SOF & EOF processor 618, respectively, shown in FIG. 6. FIG. 7 shows a round robin format that is spread in line in a horizontal direction in the data buffer 710. Here, the right side refers to the latest time, and T-NOW 711 indicates a present instant.

A timer 721, an SOF 722, and an EOF 723 store timer values, SOF addresses, and EOF addresses which constitute register triples. Register triples are formed in a round robin format but are spread in line in a vertical direction in FIG. 7. Here, the bottom side refers to the latest register triple. While the SOF 722 stores SOF addresses SOF-1, SOF-2, and SOF-3, the timer 721 stores only timer values TIMER-1 and TIMER-2 and the EOF 723 stores only EOF addresses EOF-1 and EOF-2, because the third Ethernet fame sent from a GbE MAC & RS is being received at the T-NOW 711.

Xtm 724 denotes a pointer designating the oldest register triple among the standby register triples at present, so it designates the value TIMER-1 in FIG. 7. Tnm 725 denotes a value indicating the number of standby register triples at present, so it indicates a value of 2 in the case shown in FIG. 7.

By storing the EOF address of the data buffer 611 when the outputs of the enable buffer 613, the carrier extension block 616, and the burst detector 617 simultaneously go to a low state, data including a plurality of Ethernet frames and IFGs as well as a carrier extension, which is received during a burst period, is processed as a single frame.

The data buffer 611 when the enable buffer 613, the carrier extension block 616, and the burst detector 617 are round robin buffers that store TxD<7:0> information, Tx_EN information, and Tx_ER information, respectively, using a signal GTX_CLK provided from the GbE MAC & RS. Since they are synchronized with the signal GTX_CLK, the address of the enable buffer 613 and the address of an error buffer 612 can be inferred from the address of the data buffer 611.

The output signal of a CRS generator 614 is maintained high when the signal Tx_EN or Tx_ER or a status signal 625 output from an 8-bit to 32-bit conversion & 4-lane generation block 622 is high.

A COL generator 615 generates a collision detection signal, which is always maintained low because a 10-gigabit Ethernet multiplexer according to the present invention operates in an FDX mode.

In the FDX mode, even if signals generated from the CRS generator 614 and the COL generator 615 are transmitted to the GbE MAC & RS via the GMII 650, the GbE MAC & RS ignores the signals.

In such a structure, when the signals TxD<7:0>, Tx_ER, and Tx_EN received through the GMII 650 start to be stored in the data buffer 611, the error buffer 612, and the enable buffer 613, respectively, the SOF & EOF processor 618 informs a transmit port selection controller 633 in the selection controller 630 of the number of standby frames and standby time information of the oldest standby frame using the Xtm 724 and Tnm 725 of FIG. 7.

At the request of the transmit port selection controller 633, a port selection & storage block 621 selects a particular buffer from the input buffers 610 and stores the content of the data buffer 611, the enable buffer 613, and the error buffer 612 using the SOF address and the EOF address which are stored in the SOF & EOF processor 618.

A TX_CLK generator 624 generates a 156.25 MHz clock signal to provide a clock signal TX_CLK to an IFG inserter 623, the 8-bit to 32-bit conversion & 4-lane generation block 622, and the XGMII 651.

Among the content read by the port selection & storage block 621, the 8-bit to 32-bit conversion & 4-lane generation block 622 converts the content TxD<7:0> read from the data buffer 611 into 4-lane data TxD<31:0> which is an XGMII specification.

In other words, the start of the signal Tx_EN is the first byte of a preamble signal. The 8-bit to 32-bit conversion & 4-lane generation block 622 transfers the first byte of the preamble as a start signal to the first lane of TxD<7:0> among the four lanes of TxD<32:0>. Next, the 8-bit to 32-bit conversion & 4-lane generation block 622 sequentially transfers the following 3 bytes of the preamble signal to the second lane of TxD<15:8>, the third lane of TxD<23:16>, and the fourth lane of TxD<31:24>, respectively. Then, the 8-bit to 32-bit conversion & 4-lane generation block 622 sequentially transfers the following 3 bytes of the preamble signal to the first lane of TxD<7:0>, the second lane of TxD<15:8>, and the third lane of TxD<23:16>, respectively. Next, it transfers SFD information to the fourth lane of TxD<31:24>.

Thereafter, the 8-bit to 32-bit conversion & 4-lane generation block 622 sequentially transfers the Ethernet MAC data following the SFD information to the first through fourth lanes in a round robin format until the signal Tx_EN changes from a high state to a low state, and then a termination signal (i.e., 0xFD) is inserted into the following lane. Next, it generates the value of data TXC<3:0>. For example, when the terminating signal is inserted into the third lane, the third bit of the data TXC<3:0> is in a high state, so the generated value of the data TXC<3:0> is 0x6.

As described above, the 8-bit to 32-bit conversion & 4-lane generation block 622 converts 8-bit data TxD<7:0> into 32-bit data TxD<31:0> in parallel, generates the data TXC<3:0>, and outputs the data TxD<31:0> and TXC<3:0> to the XGMII 651 using the clock signal TX_CLK generated from the TX_CLK generator 624. In addition, when there is no data to be output, the 8-bit to 32-bit conversion & 4-lane generation block 622 inserts an idle signal value (i.e., 0x07) into the remaining lanes, changes the bits of the data TXC<3:0>, which indicate the states of the lanes having idle signal value, into a high state, and outputs the data TxD<31:0> and TXC<3:0> to the XGMII 651 using the clock signal TX_CLK. For example, when the idle signal value is inserted into all the lanes, all of the bits of the data TXC<3:0> are in a high state, so the value of the data TXC<3:0> is 0xF.

The IFG inserter 623 inserts an IFG right after one triple is processed among the triples stored in the timer, the SOF, and the EOF of the SOF & EOF processor 621 with respect to a particular input port (for example, port #1) that is selected by the port selection & storage block 621 and outputs it through the XGMII 651.

In such a process, the signal Tx_ER of the GMII 650 is processed as follows. When a data error exists in a normal MAC frame, the signal Tx_ER goes to a high state when the signal TX_EN is in a high state. Accordingly, when data TxD<7:0> is converted to data TxD<32:0> of the XGMII 651, an error value (i.e., 0xFE) is inserted into the data of a lane which includes the data TxD<7:0> of the GMII 650 corresponding to the signal Tx_ER in the XGMII 651, and the bit of the data TXC<3:0> corresponding to the lane is transmitted in a high state. For example, if the lane is the first lane, the error value, 0xFE, is inserted into TxD<7:0> of the XGMII 651, and the value of TXC<3:0> is set to 0x1. When the signal TX_EN is in a low state, each lane has the idle signal value, 0x07, regardless of the high or low state of the signal Tx_ER.

While the 8-bit to 32-bit conversion & 4-lane generation block 622 outputs the data TxD<7:0> of the GMII 650 stored in the port selection & storage block 621 and the IFG of the IFG inserter 623 to the XGMII 651, the status signal 625 is in a high state and otherwise is maintained in a low state. The 8-bit to 32-bit conversion & 4-lane generation block 622 outputs the status signal 625 to a transmit status storage block 631 within the selection controller 630 and to the CRS generator 614. Then, the transmit status storage block 631 transmits the value of the status signal 625 to the transmit port selection controller 633.

A transmit table storage block 632 stores operating type (HDX or FDX) information of each of the input ports #1 through #N, which is obtained through the MUX STA 640. The transmit port selection controller 633 determines the order of priority based on the operating type information when selecting an input port. The transmit table storage block 632 transmits the operating type information to the transmit port selection controller 633 by request.

When the output of the transmit status storage block 631 changes from a high state to a low state, the transmit port selection controller 633 performs the following operations in order to operate the port selection & storage block 621.

First, in case where all input ports connected to the GMII 650 are in an HDX or FDX mode, the transmit port selection & control block 621 does not use the information of the transmit table storage block 632 when determining the order of priority. In case where some of the input ports are in an HDX mode and the other input ports are in an FDX mode, the following operations are performed.

The transmit port selection controller 633 brings the values of Tnm from the respective SOF & EOF processors 618 of all input buffers 610. If the value (for clarity, referred to as an X1 value) of Tnm which indicates the number of standby register triples at present, is at least 1, the transmit port selection controller 633 brings the value (for clarity, referred to as a T1 value) of a timer designated by the Xtm information. Next, the order of priority is determined through the following procedure.

(1) The transmit port selection controller 633 collects T1 values as described above, compares the collected T1 values, and selects and informs the port selection & storage block 621 of the information of a GMII input port having the maximum T1 value.

(2) When there are a plurality of input ports having the maximum T1 value, the transmit port selection controller 633 selects and informs the port selection & storage block 621 of the information of a GMII input port having the maximum X1 value.

(3) When there are a plurality of input ports having the maximum X1 value, the transmit port selection controller 633 selects and informs the port selection & storage block 621 of the information of a GMII input port operating in an FDX mode.

(4) When all of the GMII input ports operate in an FDX mode, the transmit port selection controller 633 informs the port selection & storage block 621 of the information of an arbitrary GMII input port.

(5) Finally, the transmit port selection controller 633 sets the T1 value of the selected input port to zero, reduces the X1 value thereof by one, and increases the value of the pointer designating the oldest register triple.

In the above procedure, the priority is given to the FDX mode in step (3), but when necessary, an input port having the maximum T1 value and operating in the FDX mode may be selected in step (1), or the FDX mode instead of the X1 value may be given the priority in step (2).

Figure 8:
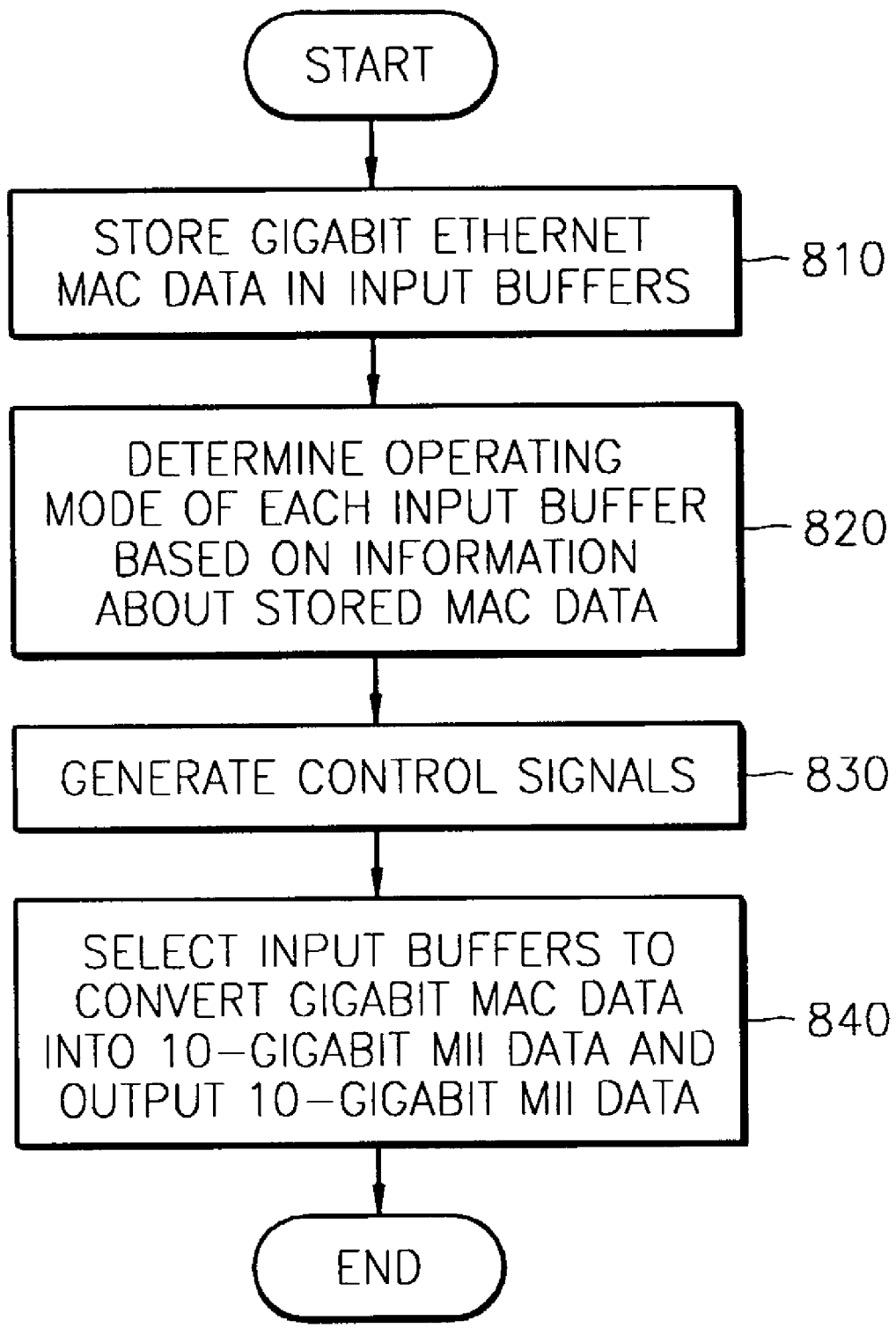
FIG. 8 is a flowchart of a multiplexing method according to an embodiment of the present invention.

FIG. 8 is a flowchart of a multiplexing method according to an embodiment of the present invention. In step 810, a plurality of input buffers store gigabit Ethernet MAC data which is input according to GMII. In step 820, a MUX STA determines the operating mode of each input buffer based on the management and status information about the stored gigabit Ethernet MAC data. In step 830, a selection controller generates control signals for sequentially selecting the plurality of input buffers and sequentially outputs the control signals to a selection & conversion block. In step 840, the selection & conversion block sequentially receives the gigabit Ethernet MAC data from the sequentially selected input buffers, converts the received gigabit Ethernet MAC data into 10-gigabit M11 data, and outputs the 10-gigabit M11 data according to XGMII.

Figure 9:
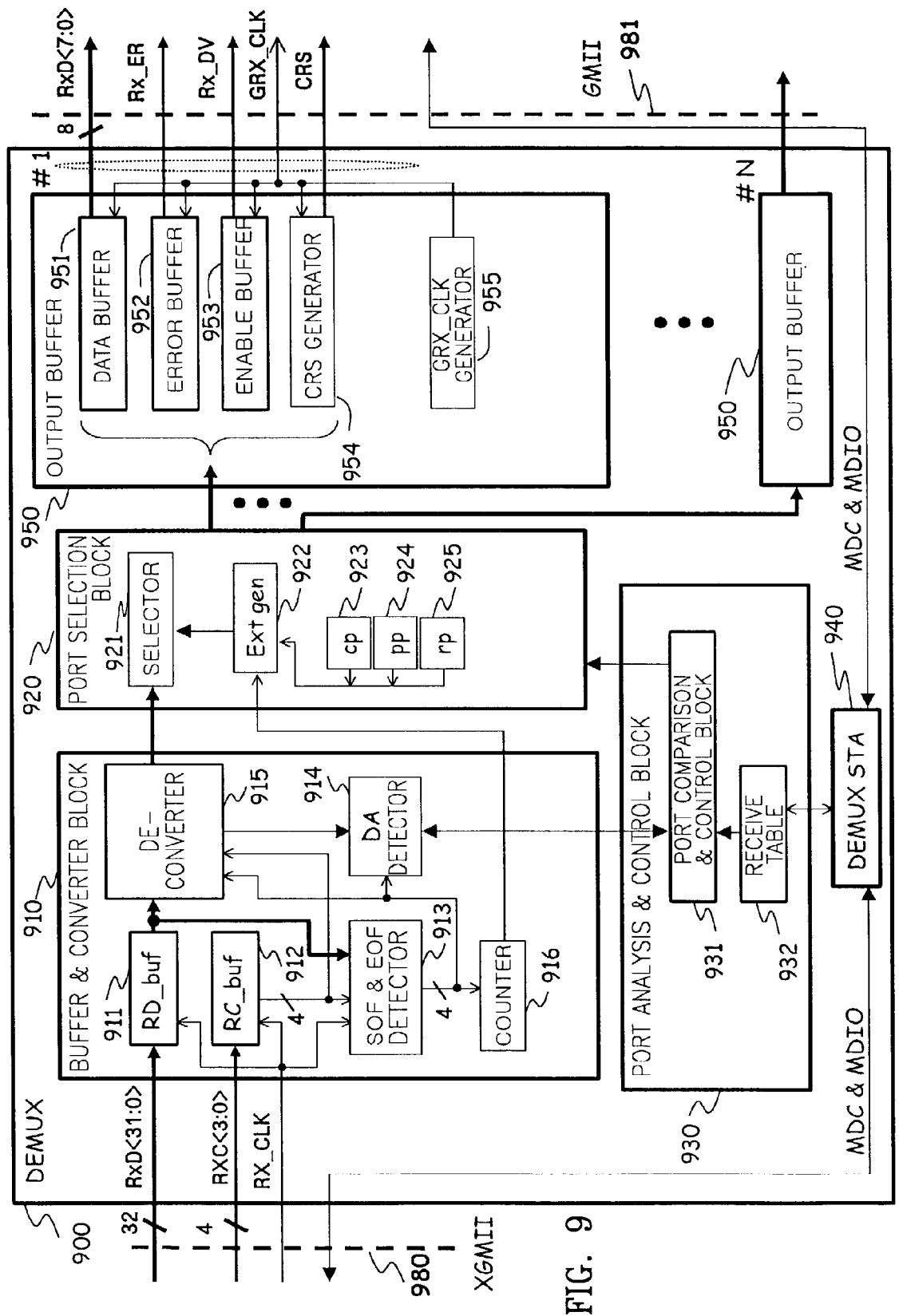
FIG. 9 is a detailed block diagram of a demultiplexer according to the present invention.

FIG. 9 is a detailed diagram of a demultiplexer according to an embodiment of the present invention. A buffer & converter block 910, a port selection block 920, a port analysis & control block 930, a DEMUX STA 940, and an output buffer 950 are the same functional blocks as the buffer & converter block 504, the port selection block 506, the port analysis & control block 505, the DEMUX STA 503, and the output buffer 507 within the DEMUX 500 shown in FIG. 4. XGMII 980 and GMII 981 are the same as the XGMII 550 and the GMII 551 shown in FIG. 4.

During DEMUX operating control, each of the ports #1 through #N is set to FDX or HDX according to the status information of the DEMUX STA 940. When auto-negotiation is required during this setting process, the DEMUX STA 940 may operate in association with a MUX STA within a multiplexer. However, such detailed operation may be different depending on an actual chip and is not included in the scope of the present invention.

As described above, an XGbE PHY provides signals RxD<31:0> and RXC<3:0> to a receive data buffer (RD_buf) 911 and a receive condition buffer (RC_buf) 912, respectively, within the buffer and converter block 910 and provides a signal RX_CLK to both RD_buf 911 and RC_buf 912, via the XGMII 980. The signal RX_CLK is a 162.25 MHz clock signal, the signal RxD<31:0> is a 32-bit parallel signal, and the signal RXC<3:0> is a 4-bit parallel signal.

The RD_buf 911 and the RC_buf 912 are round robin buffers in which read and write can be independently performed, store the signals RxD<31:0> and RXC<3:0>, respectively, in parallel, and operate at a DDR according to the signal RX_CLK.

In an idle state where no Ethernet frames are received, the signal RxD<31:0> has an idle data value (i.e., each of the values of RxD<7:0>, RxD<15:8>, RxD<23:16>, and RxD<31:24> is 0x07), and each bit of the signal RXC<3:0> is in a high state, i.e., has a value of 0xF.

The SOF & EOF detector 913 sequentially receives and checks the outputs RxD<31:0> of the RD_buf 911 and the outputs RXC<3:0> of the RC_buf 912 and finds the start and end of an Ethernet frame as follows.

If the value of RxD<7:0> is a frame start data value, i.e., 0xFB, each of the values of RxD<15:8>, RxD<23:16>, and RxD<31:24> is a preamble value, i.e., 0xAA, and the value of RXC<3:0> is 0x1, in a state where data RxD<31:0> has an idle data value and all bits of the RXC<3:0> are in a high state; and if the values of the following RxD<7:0>, RxD<15:8> and RxD<23:16> are preamble values and the value of the next RxD<31:24> is an SFD value, i.e., 0xFB, the SOF & EOF detector 913 determines that the following data is normal Ethernet MAC data and converts all of the four outputs from a low state into a high state so as to inform a de-converter 915, a DA detector 914, and a counter 916 that the following data RxD<31:0> is Ethernet MAC data starting from a destination address.

The four output signals of the SOF & EOF detector 913 correspond to RxD<7:0>, RxD<15:8>, RxD<23:16>, and RxD<31:24>, respectively. The four output signals are high if each of the four output signals indicates information (including an error within a frame) on an Ethernet frame from the start to the checksum. Otherwise, the four output signals are low.

For example, let us assume that Ethernet frame checksum information terminates with data RxD<15:8>, data RxD<23:16> has a 10-gigabit Ethernet frame termination signal value (i.e., 0xFD), and data RxD<31:24> has an idle data value (i.e., 0x07). Here, the RC_buf 912 outputs a value of 0xC, and the SOF & EOF detector 913 outputs a value of 0x3, thereby indicating that the Ethernet frame terminates with RxD<15:8>.

Accordingly, the counter 916 starts a counting operation when all of the outputs of the SOF & EOF detector 913 change from a low state (i.e., 0x0) to a high state (i.e., 0xF) and terminates the counting operation when the SOF & EOF detector 913 outputs other values than 0xF so that the counter 916 calculates the length of the received Ethernet frame and transmits the information to a carrier extension generator (Ext gen) 922.

The de-converter 915 includes a round robin buffer of at least 8 bytes, which converts RxD<31:0> received via the RD_buf 911 into four RxD<7:0> and stores the four RxD<7:0>. When all outputs of the SOF & EOF detector 913 change from a low state to a high state, the de-converter 915 converts frame start data, i.e., a value of 0xFB, into a preamble value.

When the value of RXC<3:0> received by the RC_buf 912 is not 0x0 in a state where all outputs of the SOF & EOF detector 913 are in a high state, the de-converter 915 checks RxD data corresponding to RXC<0>, RXC<1>, RXC<2>, and RXC<3>. If the checked RxD data has an error signal value, i.e., 0xFE, the de-converter 915 selects an error buffer 952 and makes a bit at a portion, which corresponds to the RxD data having the error signal value in the error buffer 952, have a high state, through a selector 921.

In addition, during a period from the preamble signal to the checksum, based on the information received from the SOF & EOF detector 913, the de-converter 915 selects the enable buffer 953 and makes bits at a portion, which corresponds to a range from the preamble to the checksum in the enable buffer 953, have a high state, through the selector 921.

Accordingly, the selector 921 selects a port designated by a cp 922 and transmits signals RxD<7:0>, Rx_DV, RX_ER, and CRS, which are generated from the de-converter 915 or the Ext gen 922, to an output buffer 950 corresponding to the port designated by the cp 922. Here, for the clarity of description, it is assumed that a first output buffer 950 is selected.

When all outputs of the SOF & EOF detector 913 change from a low state to a high state, the destination address (DA) detector 914 outputs the following 6 bytes received from the SOF & EOF detector 913 to a port comparison & control block 931.

A receive table 932 stores information about the number of GbE MAC & RSs connected to the DEMUX STA 940 via the GMII 981, information about whether each output port operates in an HDX or FDX mode, and MAC addresses of the output ports. The port comparison & control block 931 compares the 6-byte DA received from the DA detector 914 with the MAC addresses stored in the receive table 932, stores the value of a port having an MAC address the same as the 6-byte DA in the cp 923, and transmits operating mode information (HDX or FDX) of the port to the Ext gen 922. Thereafter, the port comparison & control block 931 resets the DA detector 914.

A port history table is composed of the cp 923, pp 924, and rp 925. The cp 923 indicates a port number to which a current Ethernet frame is to be transmitted. The pp 924 indicates a port number to which the previous Ethernet frame is transmitted. The rp 925 indicates a port number to which the frame before the previous Ethernet frame is transmitted.

When the port comparison & control block 931 inputs a particular port value into the cp 923, a kind of first-in first-out (FIFO) operation is performed such that a value which has been stored in the cp 923 is shifted to the pp 924, and simultaneously, a value which has been stored in the pp 923 is shifted to the rp 924.

Immediately after the selector 921 transmits an Ethernet frame to the checksum to a data buffer 951, the Ext gen 922 adds a carrier extension signal or an IFG signal via the selector 921 to the data buffer 951, the error buffer 952, and the enable buffer 953 as follows.

In a case where a port indicated by the cp 923 operates in an HDX mode and is the same port as the port indicated by the pp 924 but is not the same port as indicated by the rp 625, when the frame length received from the counter 916 is greater than 512 bytes, the Ext gen 922 adds an IFG signal (i.e., RxD<7:0> has a value of 0x0) to the Ethernet frame of the data buffer 951 after the checksum and makes the values, which correspond to the positions of the added IFG signal in the error buffer 952 and the enable buffer 953, low and high, respectively. When the frame length received from the counter 916 is less than 512 bytes, the Ext gen 922 adds a carrier extension signal (i.e., RxD<7:0> has a value of 0xF) having a length of (512—the frame length) and an IFG signal to the Ethernet frame of the data buffer 951 next to the checksum, makes the values, which correspond to the positions of the added IFG signal in the error buffer 952 and the enable buffer 953, low and high, respectively, and simultaneously adds the length of the carrier extension signal to the timer value of a CRS generator 954.

In a case where a port indicated by the cp 923 operates in an HDX mode and is the same port as the port indicated by both the pp 924 and the rp 625, the Ext gen 922 adds an IFG signal to the Ethernet frame of the data buffer 951 next to the checksum, makes the values, which correspond to the positions of the added IFG signal in the error buffer 952 and the enable buffer 953, low and high, respectively, and simultaneously adds the length of the IFG signal to the timer value of the CRS generator 954.

Lastly, in a case where a port indicated by the cp 923 operates in an FDX mode, the Ext gen 922 adds an IFG signal to the Ethernet frame of the data buffer 951 next to the checksum and makes the values, which correspond to the positions of the added IFG signal in the error buffer 952 and the enable buffer 953, low.

A GRX_CLK generator 955 generates a 125 MHz clock signal GRX_CLK and provides it to the data buffer 951, the error buffer 952, the enable buffer 953, the CRS generator 954, and a relevant GbE MAC & RS of the GMII 981.

The CRS generator 954 is a kind of timer. The CRS generator 954 outputs a signal CRS having a high state when it operates and outputs a signal CRS having a low state when it does not operate. The CRS generator 954 operates starting from the preamble of a gigabit Ethernet frame based on a timer value, which is obtained by adding the preamble value and the SFD value to the value received from the counter 916 via selector 921, i.e., (the value of the counter 916+8 bytes). The operation of the CRS generator 954 always lags behind a signal RX_DV by one clock. When a carrier extension signal is added to the data buffer 951 by the Ext gen 922, the CRS generator 954 operates based on the timer value to which the length of the carrier extension signal is further added. When an IFG signal is added to the data buffer 951, the CRS generator 954 operates based on the timer value to which the length of the IFG signal is further added.

The data buffer 951, the error buffer 952, and the enable buffer 953 are FIFO buffers, store the signals RxD<7:0>, RX_DV, and RX_ER, respectively, received via the selector 921, operate in synchronization with the clock signal GRX_CLK generated from the CRX_CLK generator 955, and always output low signals when they are empty.

Figure 10:
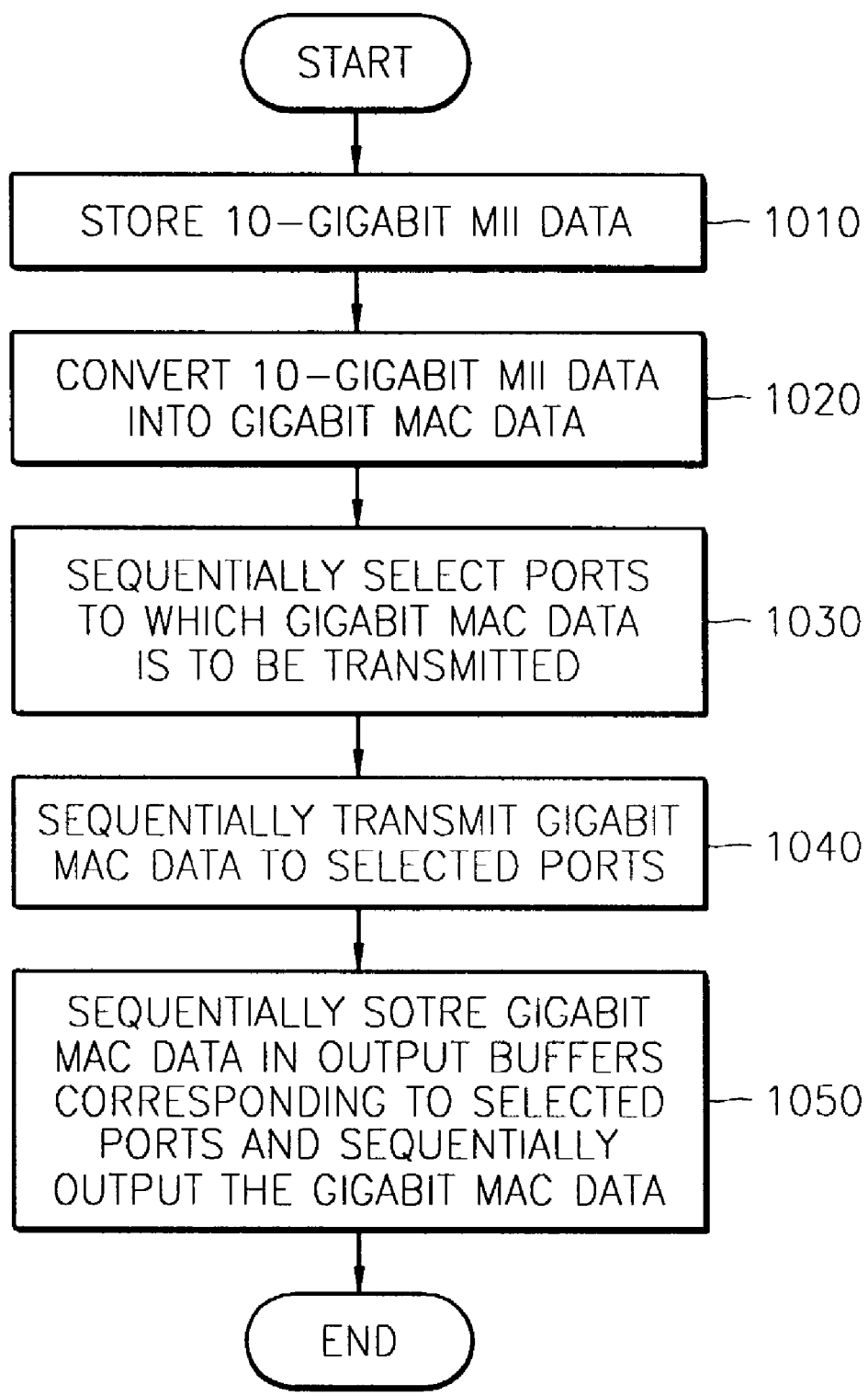
FIG. 10 is a flowchart of a demultiplexing method according to an embodiment of the present invention.

FIG. 10 is a flowchart of a demultiplexing method according to an embodiment of the present invention. A buffer & converter block stores 10-gigabit MII data received according to XGMII in step 1010 and converts the 10-gigabit MII data into gigabit Ethernet MAC data in step 1020.

Next, a port analysis & control block analyzes the destination and receiving condition of the gigabit Ethernet MAC data to select each port to which the gigabit Ethernet MAC data is to be transmitted in step 1030.

Here, a DEMUX STA determines whether each gigabit Ethernet port operates in an FDX mode or HDX mode and informs the port analysis & control block of the result of determination.

A port selection block sequentially transmits the gigabit Ethernet MAC data received from the buffer & converter block to the ports sequentially selected by the port analysis & control block in step 1040.

Lastly, a plurality of output buffers corresponding to the selected ports sequentially store and output the gigabit Ethernet MAC data in step 1050.

Figure 11:
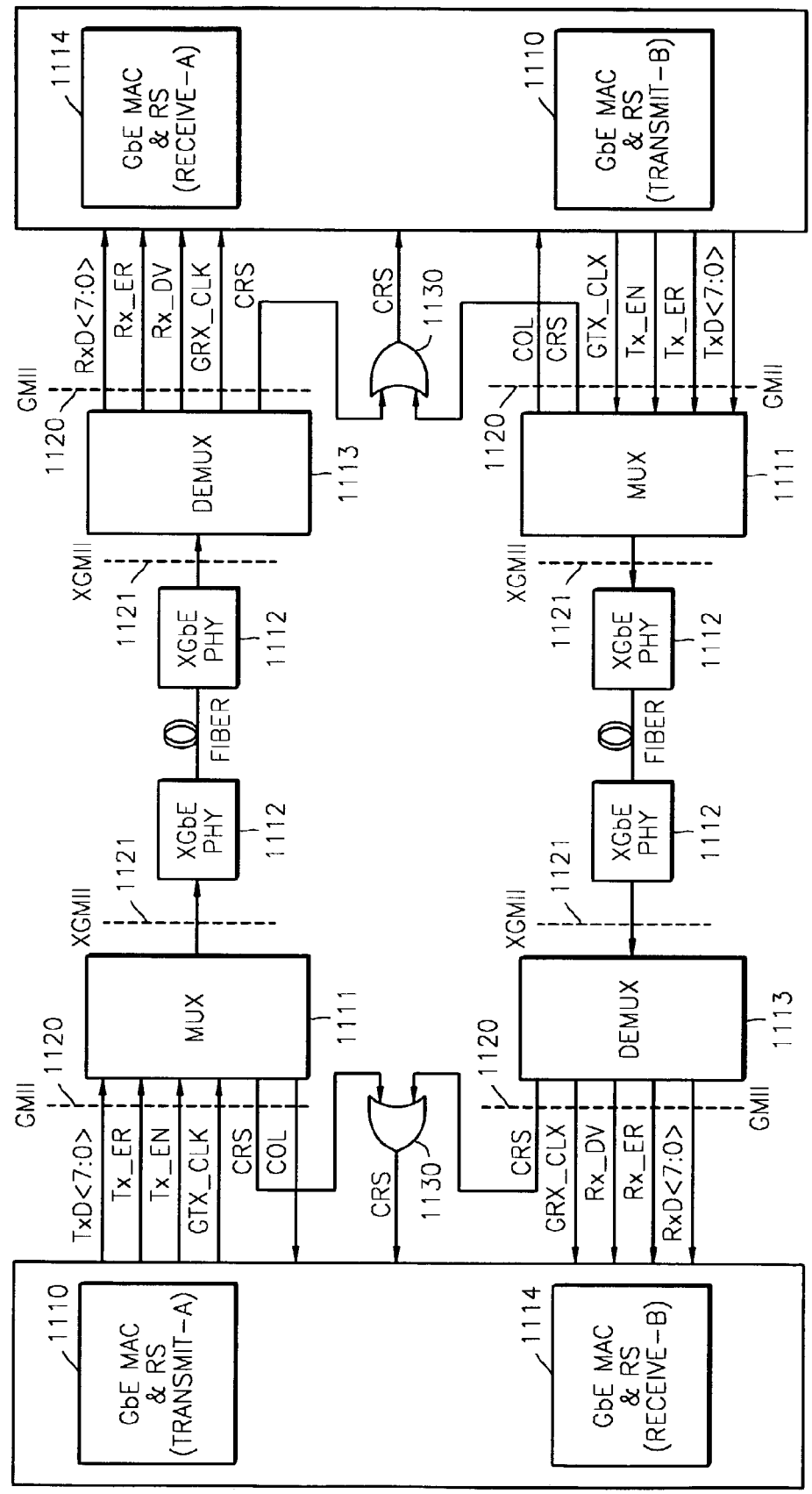
FIG. 11 is a diagram of an example of a system employing a multiplexer and a demultiplexer according to the present invention.

FIG. 11 is a diagram of an example of a system employing a multiplexer and a demultiplexer according to the present invention. In FIG. 11, a GbE MAC & RS 1110, a MUX 1111, an XGbE PHY 1112, a DEMUX 1113, a GbE MAC & RS 1114, GMII 1120, and XGMII 1121 are the same as the GbE MAC & RS 401, the MUX 400, and the XGbE PHY 402 shown in FIG. 4 and the DEMUX 500, the GbE MAC & RS 502, the GMII 551, and the XGMII 550 shown in FIG. 5. The GbE MAC & RS 1110 and the GbE MAC & RS 1114 use GMII signals in which a transmitting signal is combined with a receiving signal according to the IEEE 802.3 standard. Accordingly, the output signal CRS of the MUX 1111 is combined with the output signal CRS of the DEMUX 1113 into a single signal CRS using an OR gate 1130, and the combined signal CRS is transmitted to the GbE MAC & RS 1110 or 1114. Here, when the GbE MAC & RS 1110 or 1114 operates in an FDX mode, it ignores the signals CRS and COL. Therefore, both HDX and FDX modes can be used.

The above-described embodiments of the present invention can be made into programs which can be executed in a computer and can be implemented in a digital computer using a computer readable recording medium. In addition, the data structure used in the embodiments of the present invention can be recorded in a computer readable recording medium in various manners. The computer readable recording medium may be a semiconductor memory device (for example, ROM, RAM, NVRAM, or CAM), a magnetic storage medium (for example, a floppy disc or hard disc), an optical recording medium (for example, CD-ROM or DVD), or carrier waves (for example, a signal transmitted through the Internet).

As described above, the present invention uses packet multiplexing instead of simple TDM in order to process variable-length high-speed packets and uses a larger input bandwidth than an output bandwidth, thereby accomplishing a statistical multiplex effect. In addition, the present invention pursues universality by using standard interface for input and output interface.

Since GMII and XGMII, which is IEEE 802.3 standard interface, is used between a gigabit Ethernet MAC block and a 10-gigabit Ethernet transceiver, a universal chip can be used, and variable-length Ethernet frames can be multiplexed and demultiplexed for transmission without changing a protocol. Moreover, 10-gigabit Ethernet frames can be generated and transmitted by dynamically multiplexing packets without using an expensive and complicate functional block such as a co-processor for packet classification or traffic management. In addition, when gigabit Ethernet data is transmitted, multiplexing can be performed with respect to 10 or more gigabit Ethernet ports.

While this invention has been particularly shown and described with reference to preferred embodiments thereof, it will be understood by those skilled in the art that various changes in form and details may be made therein without departing from the spirit and scope of the invention. The preferred embodiments are used in a descriptive sense only and not for purpose of limitation. Therefore, the scope of the invention will be defined by the appended claims not by the above description, and the present invention should be construed as including all differences within the equivalent scope.

What is claimed is:

1. An apparatus for multiplexing variable-length packets, comprising a plurality of input buffers for storing gigabit Ethernet media access control (MAC) data which is input according to gigabit media independent interface (GMII); a multiplexer monitor block for determining an operating mode of each input buffer based on management and status information of gigabit Ethernet MAC data; a selection controller for generating a control signal for selecting one of the plurality of input buffers; and a selection and conversion block for sequentially selecting the gigabit Ethernet MAC data in response to the control signal, converting the selected gigabit Ethernet MAC data into 10-gigabit media independent interface (XGMII) data, and outputting the XGMII data according to XGMII;

wherein the selection controller comprises: a transmit status storage block for receiving and storing transmit status information from the selection and conversion block; a transmit table storage block for storing the address of each input port; and a transmit port selection controller for selecting a particular input buffer based on status information from a start-of-frame (SOF) and end-of-frame (EOF) processor included in each of the input buffers, the transmit information from the transmit status storage block, and information from the transmit table storage block.

2. The apparatus of claim 1, wherein each of the input buffers comprises: a data buffer for storing gigabit Ethernet MAC data in an 8-bit parallel format; an error buffer for storing an error state of input data; an enable buffer for storing enablement/disablement of data transmission; a carrier sense (CRS) generator for generating a CRS signal that indicates the state of the error buffer or the enable buffer; a carrier extension block used for extending a minimum carrier slot time; a collision generator for detecting existence/absence of data collision; a burst detector for detecting whether a plurality of Ethernet frames are continuously transmitted in one lump; and start-of-frame (SOF) and end of frame (EOF) processor for storing and processing information indicating the start and end of a frame.

3. The apparatus of claim 2, wherein the data buffer, the error buffer, and the enable buffer operate in synchronization with an input clock signal and operate together in a round robin manner.

4. The apparatus of claim 2, wherein the carrier extension block outputs a carrier extension signal only when the outputs of the error buffer and the enable buffer have a value of 1.

5. The apparatus of claim 2, wherein the burst detector detects the start of a burst when the output of the enable buffer becomes to have a value of 1 after it has a value of 1 in an idle state, in which gigabit Ethernet MAC data is not received, and detects the end of the burst when the outputs of the enable buffer and the error buffer become to have a value of 0.

6. The apparatus of claim 2, wherein the SOF and EOF processor comprises: a round robin buffer for storing triples each of which is composed of a timer value, an SOF address, and an EOF address; and a pointer for indicating the number of triples standing by ready to be processed at present and designating the oldest triple among the standby triples.

7. The apparatus of claim 1, wherein the selection and conversion block comprises: a port selection and storage block for selecting an input buffer according to the control signal from the selection controller and temporarily storing Ethernet MAC data information and status information of the input buffer; a signal conversion and lane generation block for converting the gigabit Ethernet MAC data stored in the port selection and storage block into XGMII data; an inter frame gap inserter for generating an inter frame gap and outputting it into the signal conversion and lane generation block; and a transmit clock generator for generating an XGMII transmit clock signal and providing it to the signal conversion and lane generation block and the inter frame gap inserter.

8. The apparatus of claim 7, wherein the inter frame gap inserter generates and outputs the inter frame gap immediately after each of a plurality of triples, which are each composed of a timer value, a start-of-frame (SOF) address, and an end-of-frame (EOF) address and are stored in an SOF and EOF processor of the selected input buffer, is processed.

9. The apparatus of claim 1, wherein the transmit status storage block stores address information and operating mode information of each input port that are received from the multiplexer monitor block and transmit the information to the transmit port selection controller.

10. The apparatus of claim 9, wherein the multiplexer monitor block informs the transmit table storage block whether each input port operates in a half duplex mode or a full duplex mode.

11. A method of multiplexing variable-length packets, comprising: a step (a) in which a plurality of input buffers store gigabit Ethernet media access control (MAC) data which is input according to gigabit media independent interface (GMII); a step (b) in which a multiplexer monitor block determines an operating mode of each input buffer based on management and status information of gigabit Ethernet MAC data; a step (c) in which a selection controller generates a control signal for selecting one of the plurality of input buffers; and a step (d) in which a selection and conversion block sequentially selects the gigabit Ethernet MAC data in response to the control signal, converts the selected gigabit Ethernet MAC data into 10-gigabit media independent interface (XGMII) data, and outputs the XGMII data according to XGMII;

wherein the step (c) comprises: a step (c1) in which a transmit status storage block receives and stores transmit status information from the selection and conversion block; a step (c2) in which a transmit table storage block stores the address of each input port; and a step (c3) in which a transmit port selection controller selects a particular input buffer based on status information from a start-of-frame (SOF) and end-of-frame (EOF) processor included in each of the input buffers, the transmit information from the transmit status storage block, and information from the transmit table storage block.

12. The method of claim 11, wherein the step (a) comprises: a step (a1) in which a data buffer stores gigabit Ethernet MAC data in an 8-bit parallel format; a step (a2) in which an error buffer stores an error state of input data and an enable buffer stores enablement/disablement of data transmission; a step (a3) in which a carrier sense (CRS) generator stores the state of the error buffer or the enable buffer and a carrier extension block outputs a carrier extension signal; a step (a4) in which a burst detector detects a burst signal indicating that a plurality of Ethernet frames are continuously transmitted in one lump; and a step (a5) in which a start-of-frame (SOF) and end-of-frame (EOF) processor stores and processes information indicating the start and end of each frame.

13. The method of claim 12, wherein the step (a5) comprises the steps of: (a5-1) storing a start address of an Ethernet MAC frame, which is stored in the input buffer, when the output of the enable buffer goes to a state of 1 after the outputs of the enable buffer, the carrier extension block, and the burst detector are in a state of 0; (a5-2) increasing a current standby timer value, SOF address, and EOF address by one; (a5-3) storing an end address of the Ethernet MAC frame when the outputs of the enable buffer, the carrier extension block, and the burst detector all go to a state of 0; and (a5-4) starting a timer to increase all standby timer values by one at predetermined time intervals.

14. The method of claim 11, wherein in the step (d), when a burst signal indicating that a plurality of gigabit Ethernet MAC frames are transmitted in a lump is detected, the plurality of Ethernet MAC frames and inter frame gap data are multiplexed into a single piece of XGMII data.

15. The method of claim 11, wherein the step (d) comprises: a step (d1) in which a port selection and storage block selects an input buffer according to the control signal from the selection controller and temporarily stores Ethernet MAC data information and status information of the input buffer; a step (d2) in which a signal conversion and lane generation block converts the gigabit Ethernet MAC data stored in the port selection and storage block into XGMII data; a step (d3) in which an inter frame gap inserter generates an inter frame gap and outputs it into the signal conversion and lane generation block; and a step (d4) in which a transmit clock generator generates an XGMII transmit clock signal and provides it to the signal conversion and lane generation block and the inter frame gap inserter.

16. The method of claim 15, wherein the step (d1) comprises the steps of: (d1-1) selecting the particular input buffer at the request of a transmit port selection controller; and (d1-2) transmitting the Ethernet MAC frame stored in the input buffer and data stored in an enable buffer and an error buffer to the signal conversion and lane generation block by using a start address and an end address of the Ethernet MAC frame.

17. The method of claim 11, wherein the step (c3) comprises the steps of: (c3-1) when the number of input buffers to be processed is 1 or over and there is only one input buffer having the maximum timer value, informing a port selection and storage block of information about the input buffer having the maximum timer value; (c3-2) when there is two or more input buffers having the maximum timer value, informing the port selection and storage block of information about an input buffer having the maximum standby value; (c3-3) when there is two or more input buffers having the maximum standby value, informing the port selection and storage block of information about an input buffer operating in a full duplex mode; (c3-4) when all of the input buffers operate in a full duplex mode, informing the port selection and storage block of information about an arbitrary input buffer; (c3-5) after selection of an input buffer is completed through the steps (c3-1) through (c3-4), setting the timer value stored in the SOF and EOF processor of the selected input buffer to 0 and reducing the standby value stored in the SOF and EOF processor of the selected input buffer by 1; and (c3-6) setting the pointer of the SOF and EOF processor to designate the second oldest timer.

18. An apparatus for demultiplexing variable-length packets, comprising: a buffer and converter block for storing 10-gigabit media independent interface (XGMII) data that is input according to XGMII and converting the XGMII data into gigabit Ethernet media access control (MAC) data; a port selection block for transmitting the gigabit Ethernet MAC data from the buffer and converter block to a particular gigabit Ethernet output port; a port analysis and control block for analyzing the destination and the receiving condition of the gigabit Ethernet MAC data and selecting a gigabit Ethernet output port to which the gigabit Ethernet MAC data is to be transmitted; a demultiplexer monitor block for determining whether each of gigabit Ethernet output ports operates in a full duplex mode or a half duplex mode and informing the port analysis and control block of the result of determination; and a plurality of output buffers for storing the gigabit Ethernet data received via the port selection block and outputting it;

wherein the buffer and converter block comprises: a receive data buffer for receiving and storing the XGMII data that is input according to XGMII that is standard Ethernet interface; a receive condition buffer for storing the condition of the received XGMII data; a start-of-frame (SOF) and end-of-frame (EOF) detector for detecting the start and end of the received XGMII data; a destination address detector for detecting the destination address of the received XGMII data; a counter for measuring the length of the received XGMII data; and a de-converter for converting 32-bit parallel XGMII data into an 8-bit parallel gigabit MAC data.

19. The apparatus of claim 18, wherein each of the receive data buffer and the receive condition buffer has a round robin format and operates at double data rate in synchronization with a 165.25 MHz clock signal.

20. The apparatus of claim 18, wherein the port selection block comprises: a selector for receiving data output from a de-converter and selecting one of the plurality of output buffers; carrier extension generator for generating a carrier extension and an inter frame gap and transmitting them to the selector; and a port history table for storing information about a currently selected output port and first and second previously selected output ports.

21. The apparatus of claim 18, wherein the port analysis and control block comprises: a receive table for storing operating mode information of the output ports and MAC addresses of the output ports; and a port comparison and control block for comparing a destination address with the MAC addresses stored in the receive table to select an output port.

22. The apparatus of claim 21, wherein the receive table comprises: information about the number of gigabit Ethernet MAC frame receivers connected to the demultiplexer monitor block; information about whether each output port operates in a full duplex mode or a half duplex mode; and information about the MAC addresses of the output ports.

23. The apparatus of claim 18, wherein each of the output buffers comprises: a data buffer for storing the gigabit Ethernet MAC data received from the port selection block in an 8-bit parallel format; an error buffer for storing an error state of the gigabit Ethernet MAC data stored in the data buffer; an enable buffer for storing an enable state of the gigabit Ethernet MAC data stored in the data buffer; a carrier sense (CRS) generator for storing a state of the error buffer and a state of the enable buffer; and a transmit clock generator for generating a clock signal and providing it to the data buffer, the error buffer, and the enable buffer.

24. The apparatus of claim 23, wherein the data buffer, the error buffer, and the enable buffer have a first-in first-out function and operate in synchronization with the gigabit Ethernet transmit clock signal generated from the transmit clock generator.

25. The apparatus of claim 23, wherein the CRS generator operates in synchronization of the clock signal generated from the transmit clock generator and always lags behind the enable buffer by one clock.

26. The apparatus of claim 18, wherein the demultiplexer monitor block transmits information about whether each gigabit Ethernet output port operates in a full duplex mode or a half duplex mode to the receive table of the port analysis and control block.

27. A method of demultiplexing variable-length packets, comprising: a step (a) in which a buffer and converter block stores 10-gigabit media independent interface (XGMII) data that is input according to XGMII and converts the XGMII data into a gigabit Ethernet media access control (MAC) data; a step (b) in which a port analysis and control block analyzes the destination and the receiving condition of the gigabit Ethernet MAC data and selects a gigabit Ethernet output port to which the gigabit Ethernet MAC data is to be transmitted; a step (c) in which a demultiplexer monitor block determines whether each of gigabit Ethernet output ports operates in a full duplex mode or a half duplex mode and informs the port analysis and control block of the result of determination; a step (d) in which a port selection block transmits the gigabit Ethernet MAC data from the buffer and converter block to a particular gigabit Ethernet output port; and a step (e) in which a plurality of output buffers for storing the gigabit Ethernet data received via the port selection block and outputting it;

wherein the step (a) comprises: a step (a1) in which a receive data buffer receives and stores the XGMII data that is input according to XGMII that is standard Ethernet interface; a step (a2) in which a receive condition buffer stores the condition of the received XGMII data; a step (a3) in which a start-of-frame (SOF) and end-of frame (EOF) detector detects the start and end of the received XGMII data; a step (a4) in which a destination address detector detects the destination address of the received XGMII data; a step (a5)

in which a counter measures the length of the received XGMII data and a step (a6) in which a dc-converter converts 32-bit parallel XGMII data into an 8-bit parallel gigabit MAC data.

28. The method of claim 27, wherein the step (a3) comprises the steps of: (a3-1) determining whether data stored in the receive data buffer is idle data; (a3-2) determining whether all values stored in the receive condition buffer are 1s; (a3-3) when it is determined that the data stored in the receive data buffer is idle data in the step (a3-1) and when it is determined that all of the values stored in the receive condition buffer are 1s in the step (a3-2), determining whether the least significant 8 bits of received data correspond to frame start data, whether the rest bits of the received data correspond to a preamble, and whether a value of the receive condition buffer is 1; and (a3-4) when it is determined that the least significant 8 bits of the received data correspond to frame start data, the rest bits of the received data correspond to a preamble, and the value of the receive condition buffer is 1 in the step (a3-3), and if it determined that the most significant 8 bits of the following data continuously input to the receive data buffer correspond to frame start data and the rest bits thereof correspond to a preamble, determining that data, which is continuously input to the receive data buffer thereafter, as normal Ethernet MAC data.

29. An apparatus for transmitting variable-length packets, comprising: a variable-length packet multiplexer for converting a plurality of Ethernet media access control (MAC) frames, which are received according to gigabit media independent interface (GMII), into 10-gigabit Ethernet media independent interface data and outputting the converted data according to 10-gigabit media independent interface (XGMII); and a variable-length packet demultiplexer for converting 10-gigabit Ethernet media independent interface data, which is received according to XGMII, into a plurality of Ethernet MAC frames and outputting the Ethernet MAC frames;

wherein an OR operation is performed on a carrier sense (CRS) signal of an input part of the multiplexer and a CRS signal of an output part of the demultiplexer, and the result of OR operation is used as a CRS signal for the gigabit Ethernet media independent interface.

\* \* \* \* \*